(12) United States Patent
Tan

(10) Patent No.: US 8,939,432 B1
(45) Date of Patent: Jan. 27, 2015

(54) EXPANDING DUAL DISC GATE VALVE

(71) Applicant: Alfred Eng Leng Tan, Singapore (SG)

(72) Inventor: Alfred Eng Leng Tan, Singapore (SG)

( * ) Notice: Subject to any disclaimer, the term of this patent is extended or adjusted under 35 U.S.C. 154(b) by 139 days.

(21) Appl. No.: 13/740,607

(22) Filed: Jan. 14, 2013

Related U.S. Application Data

(60) Provisional application No. 61/683,844, filed on Aug. 16, 2012, provisional application No. 61/604,236, filed on Feb. 28, 2012, provisional application No. 61/594,462, filed on Feb. 3, 2012.

(51) Int. Cl.
*F16K 25/00* (2006.01)
*F16K 3/24* (2006.01)

(52) U.S. Cl.
CPC .................................. *F16K 3/24* (2013.01)
USPC ........... 251/197; 251/204; 251/284; 251/328; 251/329

(58) Field of Classification Search
CPC .............. F16K 3/14; F16K 3/10; F16K 3/18; F16K 3/184; F16K 3/188; F16K 3/0227; F16K 3/0281; F16K 51/02; F16K 3/186
USPC .................... 251/193–204, 328–329, 84, 284
See application file for complete search history.

(56) References Cited

U.S. PATENT DOCUMENTS

| | | | | |
|---|---|---|---|---|
| 834,878 A * | 11/1906 | Anderson | ....................... | 251/167 |
| 936,454 A * | 10/1909 | Jefferson | ....................... | 251/167 |
| 1,134,811 A * | 4/1915 | Berger | ........................... | 251/187 |
| 2,100,996 A * | 11/1937 | Moore | ........................... | 251/167 |
| 2,520,364 A * | 8/1950 | Hobbs | ............................ | 251/167 |
| 2,600,115 A * | 6/1952 | Kliewer, Sr. | ................... | 251/167 |
| 2,711,877 A * | 6/1955 | Doster | ........................... | 251/197 |
| 3,152,786 A * | 10/1964 | Soderberg et al. | ............ | 251/167 |
| 3,586,034 A * | 6/1971 | Karzeniowski | ............... | 137/222 |
| 3,695,578 A * | 10/1972 | Walther et al. | .................. | 251/94 |
| 4,314,579 A * | 2/1982 | Wheatley et al. | ............. | 137/312 |
| 4,376,526 A * | 3/1983 | Freeman | ....................... | 251/328 |
| 4,706,934 A * | 11/1987 | Brown | ............................ | 251/87 |

* cited by examiner

*Primary Examiner* — Marina Tietjen
(74) *Attorney, Agent, or Firm* — Kenneth L. Nash

(57) ABSTRACT

An expanding dual disc gate valve that can be used in applications requiring double block and bleed type systems. A stem is positioned in the center of a valve body with a first and second gate arranged on opposite side of the stem with respect to each other. The first and second gates are slidingly engaged with the stem so that the stem controls their movement between an open and a closed position with respect to an inlet and an outlet of the valve body. As the gates approach the closed position they encounter a shoulder of the valve body preventing further downward movement, whereby further force from the stem wedges the first and second gates outward to create a sealing arrangement with a seat ring of the valve body.

16 Claims, 9 Drawing Sheets

EXPANDING DUAL DISC GATE VALVE

This application claims benefit of U.S. Provisional Application No. 61/594,462 filed Feb. 3, 2012, U.S. Provisional Application No. 61/604,236 filed Feb. 28, 2012, and U.S. Provisional Application No. 61/683,844 filed Aug. 16, 2012. The above listed applications are all incorporated herein by reference.

BACKGROUND OF THE INVENTION (1) Field of the Invention

One possible embodiment of the present disclosure relates, generally, to double block and bleed valves. Specifically, one possible non-limiting embodiment of the present disclosure relates to an expanding dual disc gate valve providing substantially frictionless movement during operation.

(2) Description of the Background

Double block and bleed valves are commonly used in applications requiring simultaneous blocking of both upstream and downstream flow. Conventional systems for double block and bleed valves require the use of two valves and a center spool piece inserted between the two valves. A bleed valve is then fitted in this center spool piece to drain any hydrocarbons and/or pressure from the spool piece, providing verification of seat and seal integrity of the respective valves.

These valves are effective in multiple applications including off-shore platforms, aviation fueling, tank farms, terminals, custody transfer units, meter stations, multi-product manifolds, bulk product isolation, and the like.

Seal abrasion is an inherent problem in the design of these valves, whether the design implements a ball valve or a gate valve. The seating segments become scored as the ball and/or gate make metal to metal contact with the valve body when cycling between the open and closed positions, and/or wedged into the sealing position. After time, foreign particles become lodged between the seat of the ball or gate further scoring the seating surfaces, and ultimately result in valve leakage.

Corrosion of the plug is another common issue associated with double block and bleed valves, contributing to seizing slips, damaged seals, and peeling and/or cracking of the electro nickel plated seats. Furthermore, maintenance and repair of conventional double block and bleed valves are both costly and time consuming, in addition to being too bulky for compact applications.

A need exists for a valve system that is resistant to the seal abrasion and corrosion problems. A need also exists for inline repairable/replaceable seals should maintenance be required for the internal valve components. Those of skill in the art will appreciate the present system which addresses the above and other problems.

SUMMARY OF THE INVENTION

It is a primary object of the present invention is to provide an improved double block and bleed valve.

Another object of the present invention is to provide an improved double block and bleed gate valve that substantially eliminates seat abrasion and corrosion during operation.

Still another object of the present invention is to provide an improved expanding dual disc gate valve requiring less costly maintenance and reduced downtime for repair.

Yet another object of the present invention is to provide an improved expanding dual disc gate valve with a bottom body drain and bonnet bleed to allow flushing of debris from valve cavity.

Other objects and advantages of the present invention will become apparent from the following descriptions, taken in connection with the accompanying drawings, wherein, by way of illustration and example, an embodiment of the present invention is disclosed. However, it will be understood that the present invention is not limited to the above and/or other objects of the invention.

Accordingly, the present invention provides an expanding dual disc gate valve. In one possible non-limiting embodiment, a dual disc gate valve may comprise a valve body defining a flow path therethrough, a valve stem with a valve stem moveable transversely with respect to the flow path. The valve stem is mounted for axial movement in line with an axis of the valve stem. A first disc is slidingly connected with respect to the valve stem on a first side of the valve stem. The first disc is slidable at a first angle with respect to the axis of the valve stem. A second disc is slidingly connected with respect to the valve stem on a second side of the valve stem. The second disc being slidable at a second angle with respect to the axis of the valve stem. The valve stem is operable for moving the first disc and the second disc into and out of the flow path to an open position and a closed position of the dual disc gate valve.

A first sealing assembly is positioned on a first side of the flow path with respect to the valve stem. A second sealing assembly is positioned on a second side of the flow path with respect to the valve stem.

In one possible non-limiting embodiment, at least one spring is positioned to apply a force the first disc and the second disc that facilitates fully retracting the first disc and second disc before frictionless movement of the discs out of the flow path and into a valve cover to provide that the valve is fully open with an unobstructed flow path.

In one possible non-limiting example, at least one stop surface can be positioned to stop movement of the first disc and the second with the axial movement of the valve stem towards the closed position whereby continued axial movement of the stem urges the first disc and the second disc to an expanded position so that first disc expands away from the valve stem and engages with the first sealing assembly. In mirror fashion, the second disc expands in an opposite direction and disc engages with the second sealing assembly. When it is desired to open the valve, initial axial movement of the valve stem away from the flow path urges the first disc and the second disc to a contracted position to disengage the first disc from the first sealing assembly and the second disc to disengage from the second sealing assembly prior to movement of the discs out of the flow path. Only after the first and second discs are in the retracted position, then continued axial movement of the valve stem away from the flow path urges the retracted discs for frictionless movement out of the flow path into a housing or cover on the valve body.

In other words, the discs are movable in two directions, axially with the valve stem to frictionlessly move the discs into and out of the flow stream, and essentially perpendicular to the valve stem once the discs are in the flow stream to fully close the valve in the expanded position or to fully retract the discs to provide for the frictionless movement.

In one possible embodiment, the first angle and the second angle at which the discs slide with respect to the valve stem have the same magnitude but are in opposite directions with respect to the stem axis to provide that the discs move in opposite directions for engaging seals on opposite sides of the valve stem. The angles are directed to cause the discs to slide along the flow path toward the sealing assemblies and may slide substantially parallel to an axis of the flow path but in opposite directions.

The at least one spring is positioned to urge the first disc and the second disc in a direction toward the stop surface and is used to insure that the discs are in fully retracted position before they are moved out of the flow path to provide frictionless movement that avoids contact with the sealing assemblies. The at least one spring or multiple springs ensure operation when the valve is positioned with the stem in non-vertical positions.

The at least one spring can be mounted at an angle with respect to the stem axis, if desired. Although the invention is not limited to this type of mounting, providing springs at the same angles as the sliding connection between the discs and valve stem maximizes the force provided by the springs. On one possible non-limiting embodiment, the at least one spring comprises a first spring and a second spring. The first spring can be oriented at least substantially in an angle and direction corresponding to the first angle. The second spring can be oriented substantially in an angle and direction corresponding with the second angle.

The dual disc gate valve may further comprise a plurality of grooves or slots in the at least one stop surface. The grooves or slots may or may not go through the stop surface and are preferably positioned enhance debris removal from the stop surface. The movement of the discs may be utilized to sweep debris into the grooves or slots. As well, a flushing mechanism may be provided to flush debris from the valve when the discs and/or bleed pressure from the valve body to verify seal integrity when the discs are in the expanded position.

The first sealing assembly comprises a first seal for engagement with the first disc and the second sealing assembly comprises a second seal for engagement with the second disc. In one non-limiting embodiment, the first seal and the second seal are in-line replaceable from an interior of the valve body. In other words, once the valve body is connected to the line, the seals can be removed while the body remains attached to the line. For example, the bonnet, valve stem, discs, and other internal components can be removed and the seals changed from within the valve housing without removing the sometimes large valve housing from the line.

In one possible non-limiting embodiment, the first seal and the second seal comprise resilient seat rings. In another possible non-limiting embodiment, the first seal and the second seal comprise metal-to-metal seals. In either embodiment, a combination of resilient and/or metal-to-metal seals may be utilized and/or other types of seals may be utilized.

In one embodiment, the valve stem in a closed position extends across the flow path to a support on the valve housing so that the valve stem is supported on both sides of the flow path to reduce strain on the valve stem that is more likely to occur with larger discs used to close off larger flow paths.

The invention may utilize a method for making a dual disc gate valve, which may comprise non-limiting steps such as, for example, providing a valve body defining a flow path therethrough, mounting a valve stem being mounted for axial movement in line with an axis of the valve stem transversely with respect to the flow path, slidingly connecting a first disc with respect to the valve stem on a first side of the valve stem whereby the first disc is slidable at a first angle with respect to the axis of the valve stem, slidingly connecting a second disc with respect to the valve stem on a second side of the valve stem, the second disc being slidable at a second angle with respect to the axis of the valve stem, mounting a first sealing assembly on a first side of the flow path with respect to the valve stem, mounting a second sealing assembly on a second side of the flow path with respect to the valve stem, and providing that the valve stem is operable for moving the first disc and the second disc into and out of the flow path and for expanding the discs to provide an open position with the flow path unobstructed and a closed position with the discs wedgingly secured against the seals.

In one non-limiting embodiment, an additional step may comprise mounting at least one spring to apply a force to the first disc and the second disc, and providing at least one stop surface whereby when the first disc and the second disc are engaged with the stop surface. The first disc and the second disc are moveable to an expanded position so that first disc engages with the first sealing assembly and the second disc engages with the second sealing assembly, and whereby the first disc and the second disc are spring assisted moveable to a contracted or retracted position to disengage the first disc from the first sealing assembly and the second disc from the second sealing assembly. However, it will be understood that in one possible non-limiting example the one or more springs could be an optional component.

On one possible non-limiting embodiment, the method may comprise providing the first sealing assembly with a resilient seat ring positioned within a groove, providing that when the valve is in the open position the resilient seat ring has a concave back that extends away from the groove, and providing that when the valve is in the closed position the concave back is compressed to engage the groove.

In another possible non-limiting embodiment, the method may comprise providing that the first sealing assembly comprises a metal tongue and a metal receptacle, providing that the metal tongue has a distal end larger than a base or bottom of the metal receptacle, providing angled sides for the metal tongue and the metal receptacle whereby in the closed position the angled sides are wedgingly engaged to provide a metal-to-metal seal.

In yet another non-limiting embodiment, the dual disc gate valve may comprise elements such as but not limited to a valve body with a flow path therethrough, a valve cover mounted to the valve body that covers a valve cover opening leading to the flow path, a first sealing assembly mounted around a first side of the flow path and a second sealing assembly mounted around a second side of the flow path, and a first disc and a second disc mounted to be moveable in a retracted position into the flow path. The first disc and the second disc are mounted to be moveable to an expanded position when positioned in the flow path.

A first seal mounted in the first sealing assembly is positioned to engage with the first disc when the first disc is in the expanded position and offset from the first disc when the first disc is in the retracted position. A second seal mounted in the second sealing assembly which is positioned to engage with the second disc when the second disc is in the expanded position and offset from the second disc when the second disc is in the retracted position.

In one non-limiting embodiment, the first seal and the second seal are mounted so as to be removable through valve cover opening whereby the first seal and the second seal are in-line replaceable.

In one non-limiting embodiment, the dual disc gate valve may further comprise a first metal seat ring holder mounted to the valve body and a second metal seat ring holder mounted to the valve body. In this embodiment, the first seal is mounted to the first metal seat ring holder and the second seal is mounted to the second seat ring holder. A first seat ring holder seal may be utilized between first metal seat ring holder and the valve body. A second seat ring holder seal may be utilized between the second metal seat ring holder and the valve body. In a particular embodiment, the first metal seat ring holder and the second metal seat ring holder are mounted such that the first seat ring holder seal and the second seat ring holder seal are removable through the valve cover opening.

In another possible non-limiting embodiment, the first seal may comprise a first metal tongue and a first metal receptacle. Both encircle the flow path. The first metal tongue may comprise a first metal tongue distal end larger than a first metal receptacle base, e.g., the bottom of the receptacle. The first seal may, if desired, comprise angled sides for the first metal tongue and the first metal receptacle whereby in the closed position the first angled sides are wedgingly engaged to provide a metal-to-metal seal.

Most typically as a mirror image, the second seal may comprise a second metal tongue and a second metal receptacle, both of which encircle the flow path on the opposite side of the valve stem. The second metal tongue may comprise a second metal tongue distal end larger than a second metal receptacle base, e.g., the bottom surface of the receptacle. If desired, the second angled sides for the second metal tongue and the second metal receptacle are wedgingly engaged to provide a metal-to-metal seal.

In yet another non-limiting embodiment, the first seal may comprise a first resilient seat ring positioned within a first groove, which encircle the flow path on one side of the valve stem. In this particular embodiment, when the first and second disc are in the retracted position, then the first resilient seat ring has a first concave back that extends away from a first bottom of the first groove, and when the valve is in the closed position then the first concave back is compressed to engage the first bottom of the first groove.

The second seal may comprise a second resilient seat ring positioned within a second groove, whereby when the first and second disc are in the retracted position, then the second resilient seat ring has a second concave back that extends away from a second bottom of the second groove, and when the valve is in the closed position then the second concave back is compressed to engage the second bottom of the second groove.

In yet another non-limiting embodiment, a bottoming structure is located within the valve body for accumulating debris from within the valve body to prevent damage to the first and second discs. The bottoming structure may comprise a shoulder adjacent recessed basin. The bottoming structure may further comprise a drain for removing the debris from the valve body. The shoulder can be slotted for allowing particles and/or debris to be forced through the shoulder by the first and second discs.

The dual disc gate valve may further comprise a flushing system operable for flushing the debris through the drain when the first disc and the second disc are in the expanded position whereby the dual disc gate valve is in a closed position. For example, valves may be provided in the cover and the bottoming which are opened to allow fluid to flow through the cover and valve body while the flow path through the valve housing is blocked by the discs.

BRIEF DESCRIPTION OF THE DRAWINGS

The accompanying drawings, which are incorporated in and constitute a part of this specification, illustrate an implementation of apparatus consistent with one possible embodiment of the present disclosure and, together with the detailed description, serve to explain advantages and principles consistent with the disclosure. In the drawings.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE INVENTION

Figure 1:
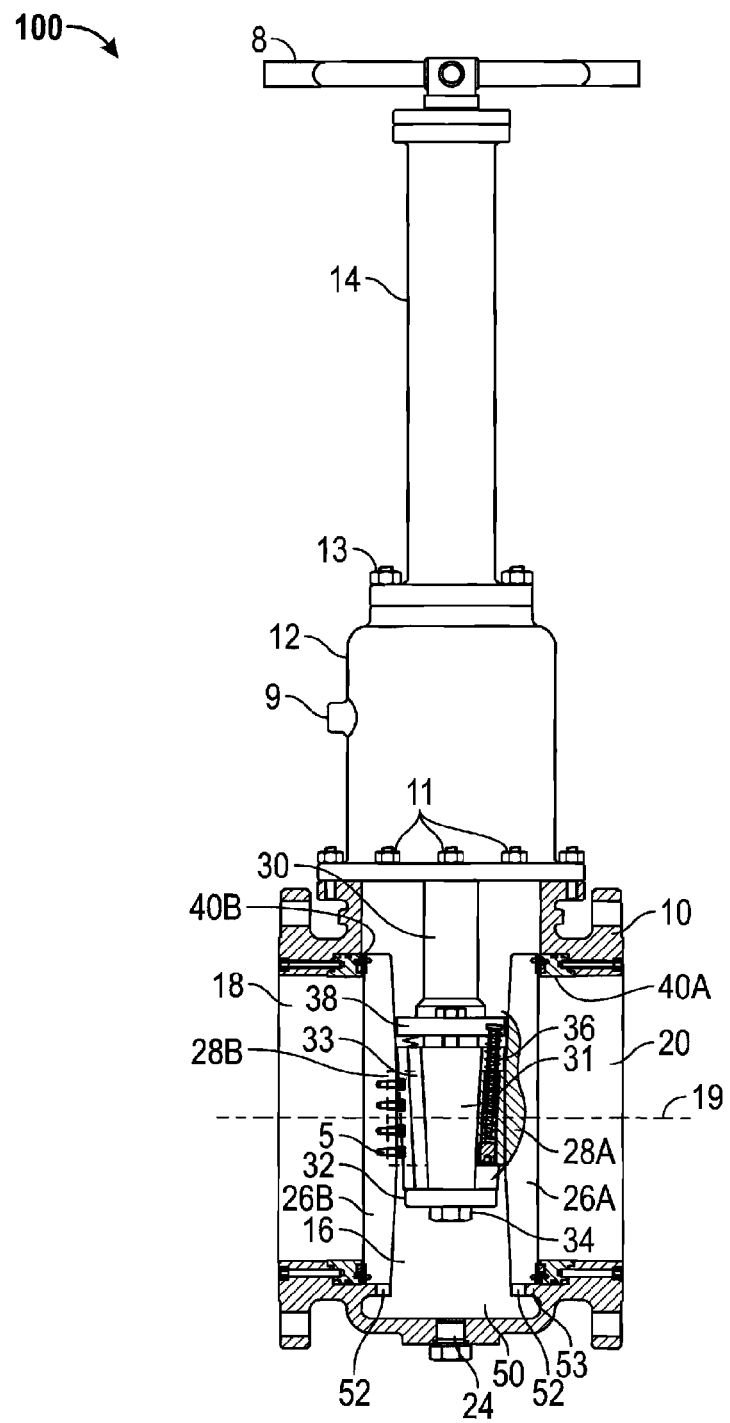
FIG. 1 is an elevational view, partially in section, of an expanding dual disc gate valve in the fully closed position with discs in the expanded position in accord with one possible embodiment of the present invention.

Turning now to the figures, FIG. 1 illustrates expanding dual disc gate valve 100 in a valve closed position with the discs 26A and 26B in the expanded position in accord with one possible embodiment of the present invention. More generally, expanding dual disc gate valve 100 comprises valve body 10 defining a flow path along axis 19 depicted in FIG. 1. Valve body 10 is secured to top cover 12 by bolts 11 and top cover 12 is secured to bonnet 14 by bolts 13. In the valve open position, the discs 26A and 26B are pulled out of the flow path into valve cover 12.

Figure 6A:
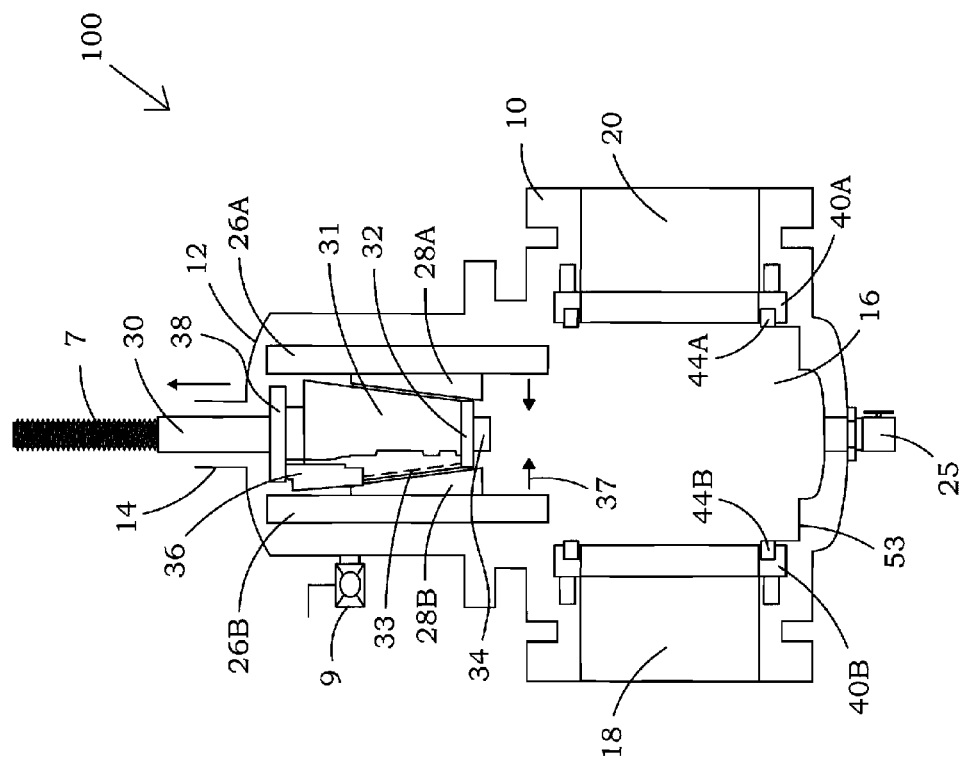
FIG. 6A is a conceptual view that illustrates an expanding dual disc gate valve in the open position with the dual discs pulled into a cover on the valve housing out of the fluid flow path through the valve housing in accord with one possible embodiment of the present invention.
Figure 6B:
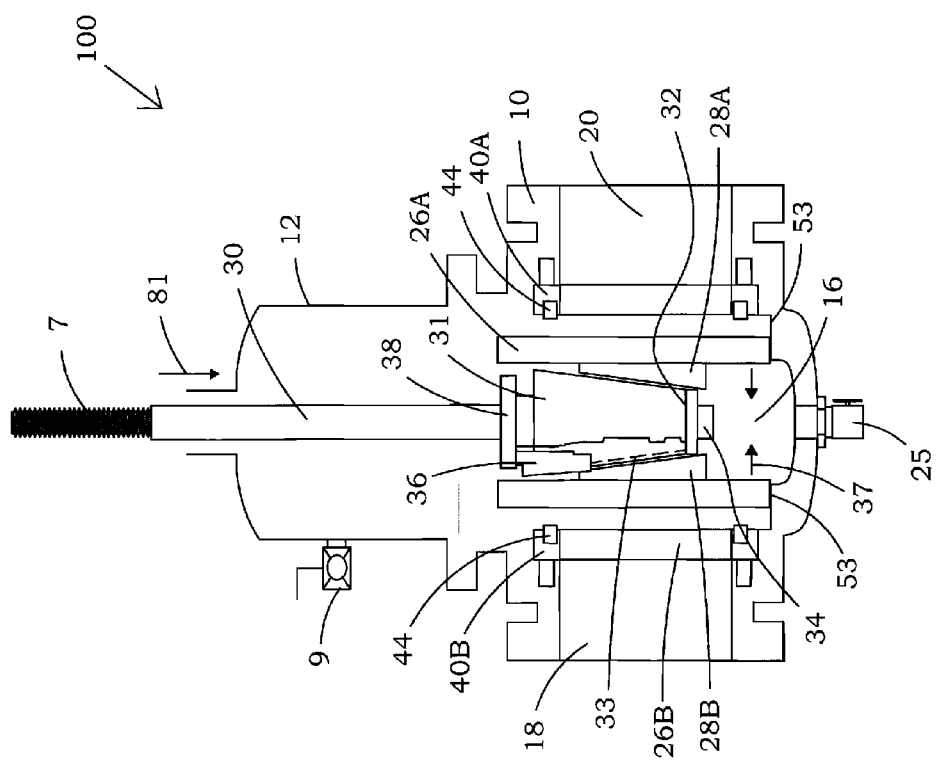
FIG. 6B is a conceptual view that illustrates an expanding dual disc gate valve in between the open and closed positions positioned in the flow path with the dual discs in a retracted position either prior to moving to the expanded valve closed position as shown in FIG. 6C or prior to being pulled into the valve cover valve open position of FIG. 6A in accord with one possible embodiment of the present invention.
Figure 6C:
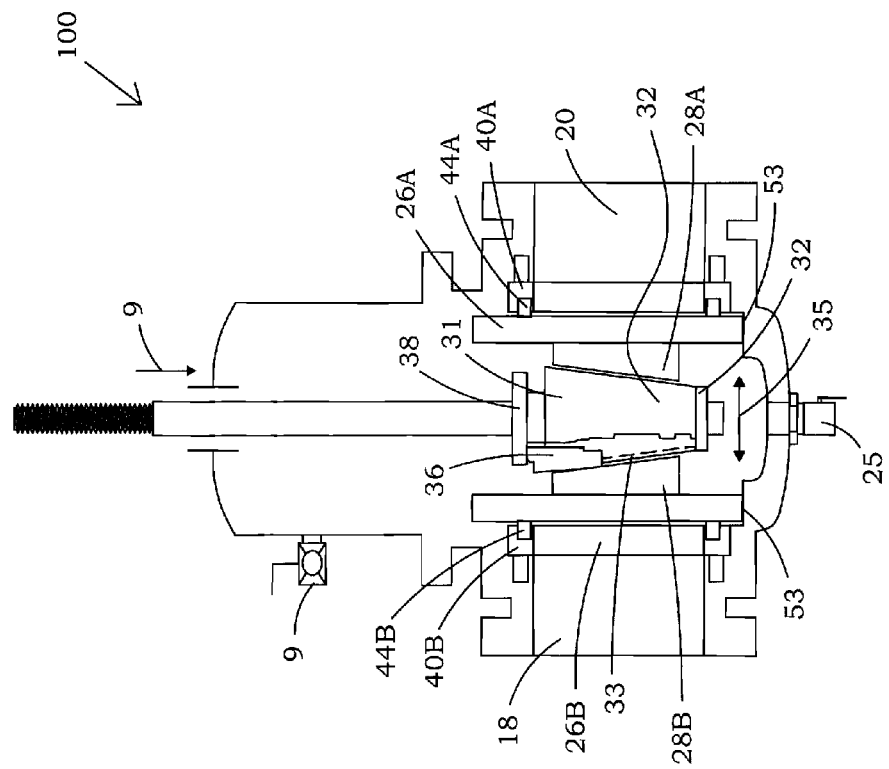
FIG. 6C is a conceptual view that illustrates an expanding dual disc gate valve in the expanded valve closed position in accord with one possible embodiment of the present invention.

As perhaps more clearly shown in FIGS. 6A, 6B, and 6C, stem 30 is disposed within valve chamber 16 and vertically movable between an open position where valve stem 30 pulls discs 26 A and 26B into the recess from the flow path within top cover 12 as shown in FIG. 6A and a closed position, which places discs 26A and 26B directly impeding the flow path between the valve openings and expands discs 26A and 26B to engage the seals, which may of various types, on opposite sides of the valve stem as shown in FIG. 6C. Accordingly, valve stem 30 moves transversely, e.g., perpendicular to the flow path and/or axis 19 as a result of threaded screw rod 7 being rotated within the internal threads of valve stem 30.

The valve openings are referred to for non-limiting convenience only as inlet 18 and outlet 20 in valve chamber 16 but are not limited to the valve necessarily being restricted to particular connection arrangements as inlets, outlets, upstream, or downstream. The terms inlet 18 and outlet 20 are simply used for convenient reference purposes in describing FIG. 1, and nothing in this disclosure should be construed at limiting the present invention's applications although in some applications a specified upstream and downstream designation may be used, if desired. In a similar way, other terms such as "up", "down", "top", "bottom" and the like may be used only as convenience in describing the invention, which may be oriented differently in operation and transport. However, if desired, the valve could be constructed to be connected with a specific connection being upstream or downstream. Moreover, the drawings are intended to be a guide to show the concepts of operation rather than actual production line drawings. The drawings are not intended to be of actual size and/or dimensions and/or may or may not show various components that may be found in standard valve constructions and are not intended to be detailed machine level production manufacturing drawings. Many variations are possible, only some of which are discussed herein.

As the bottom portion of stem 30, wedge connector 31 is formed or attached. Disc 26B is engaged with wedge connector 31 by disc slide 28B. In one embodiment, shown in FIGS. 1 and 2, disk slide 28B may be fastened to disc 26B by bolts 5. Referring again to FIG. 6A, FIG. 6B, and FIG. 6C, disk slide 28B fits and slides within angled or wedged slot 33. Disc slide 28A provides a similar mirror image arrangement on the opposite side of wedge connector 31. In one possible embodiment, slot 33 is angled with respect to valve stem 30 by an angle in a non-limiting range from two degrees to twenty degrees towards the sealing assembly 44B, but may comprise an angle outside of this range. The angle direction is toward valve opening 18. A corresponding slot, which also shows generally spring assembly 36 is provided at a second angle of the same magnitude but directed in the opposite direction toward valve opening 20. Other angles than the above could be used for the sliding interconnections of the discs with respect to the valve stem. Accordingly, disc 26A is secured by disc slide 28A to wedge connector 31 in the same manner on an opposite side of wedge connector 31 with respect to disc 26B. Thus, the discs can be moved both parallel to axis of the flow path and vertical to the axis of the flow path. Lower stem bracket 32 is secured to stem 30 by stem bolt 34 which limits the lowermost amount of sliding movement of disc slides 28A and 28B thereby retaining disc 26A and 26B on stem 30. Upper end plate 38, at the upper portion of wedge connector 31 limits upward sliding movement disc slides 28A and 28B. However, powerful wedging engagement with the seals, such as 44A or 44B or other seals at valve openings 18 and 20 on opposite sides of stem 30 limit horizontal movement of discs 26A and 26B.

Various types of sliding interconnections could be utilized between wedge connector 31 and disks 26A and 26B. In one embodiment, each disc slide 26A and 26B has a T-shaped cross-section, which fits into a corresponding T-shaped groove 33 (in cross-section) on wedge connector 31. Once the disks are mounted by sliding onto wedge connector 31, they are prevented from sliding off by use of stem bolt 34 and stem bracket 32. It will be appreciated that because the sliding interconnections are angled with respect to the axis of stem 30, that the discs can move horizontally outward in a direction parallel to flow path axis 19 to an expanded position as indicate by arrows 35 shown in FIG. 6C or inwardly to a retracted position as indicated by arrows 37 shown in FIG. 6A when the disc slides 28A and 28B move within slots 33. Depending on the size of the valve, the amount of horizontal travel could be several centimeters.

During movement of discs 26A and 26B in the direction transverse or perpendicular to the flow path or flow path axis 19, the discs are in a retracted position as indicated by arrows 37 in FIG. 6A and FIG. 6B. When at the bottom of travel of discs 26A and 26B perpendicular to flow path axis 19 as shown in FIG. 6B and FIG. 6C, as discussed hereinafter, discs 26A and 26B can be retracted or expanded in opposite directions parallel to flow path 19. Accordingly, the discs are moved in different directions.

When the discs are frictionlessly moved perpendicular to the flow path axis 19, the discs are in the retracted position as indicated by arrows 37, shown in FIG. 6A and FIG. 6B. To engage the valve seats, the discs are moved to the expanded position in FIG. 6C, and in FIG. 1 and FIG. 2. Because the discs are in a retracted position during opening or closing of the valve, movement of the discs is frictionless thereby greatly reducing wear on the discs and disc seals, as discussed in more detail hereinafter.

Actuator 8 (shown in FIG. 1) can be mounted on a top portion of bonnet 14 or another portion of the bonnet (shown in FIG. 2) and connected with stem 30 by means of screw rod 7 (as shown in FIG. 6A, FIG. 6B and FIG. 6C) located within bonnet 14, for moving stem 30 upwardly and downwardly. In this embodiment, actuator 8 is utilized to rotate screw rod 7, shown in FIG. 6A, for example. It will be appreciated that many other mechanical means for moving stem 30 upwardly and downwardly in line with the axis of stem 30 may be utilized. In the present embodiment, actuator 8 is manually driven, although alternative embodiments may use hydraulic, electric, or pneumatic means for actuator 8 to energize stem 30 during operation of expanding dual disc gate valve 100. In a presently preferred embodiment, stem 30 moves in line with the axis of stem 30 either upwardly or downwardly as indicated in the drawings.

Figure 2:
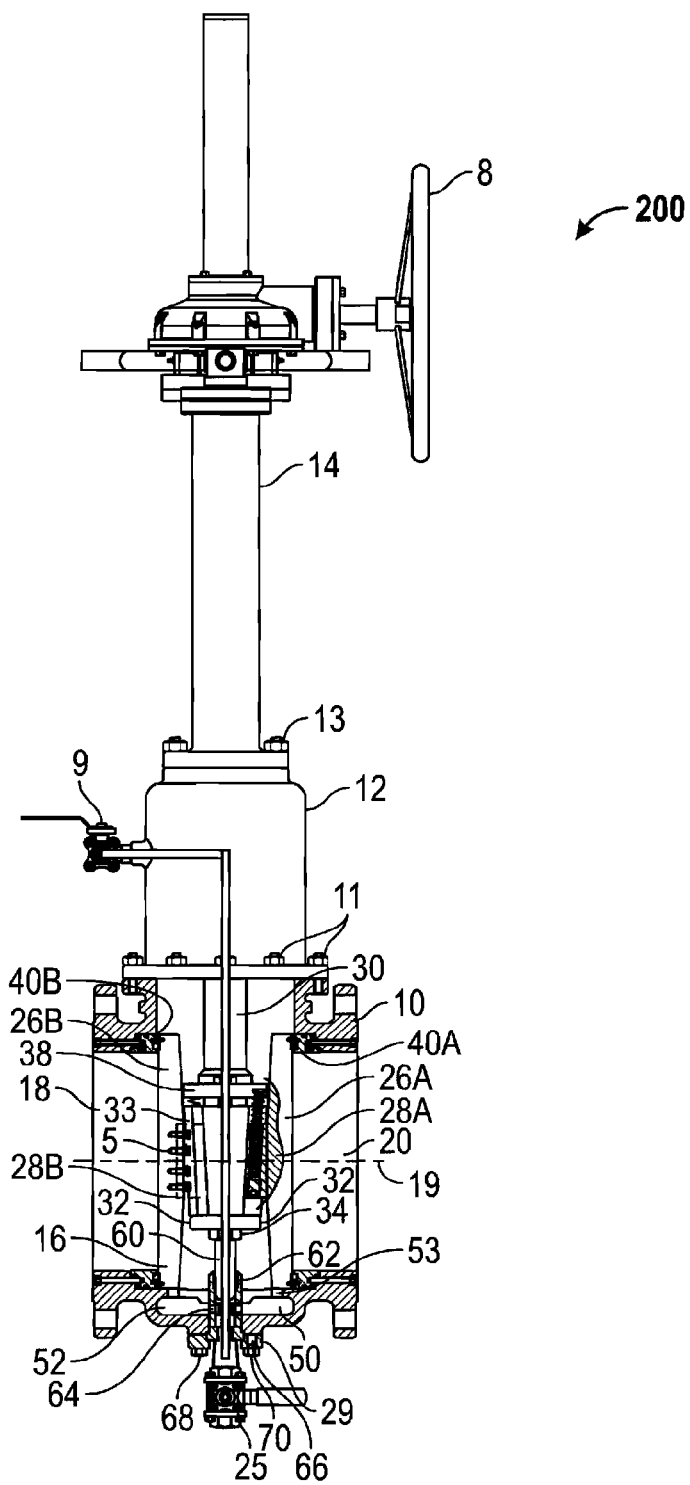
FIG. 2 is an elevational view, partially in section, of the expanding dual disc gate valve of FIG. 1 with flushing system and associated valves in accord with one possible embodiment of the present invention.

Referring now to FIG. 1 and FIG. 2, bottoming structure 50 serves to trap any debris present within valve chamber 16 that may interfere with proper valve function, outwardly movement of discs 26A and 26B, and/or damage discs 26A and 26B, as well as sealing assemblies or arrangements 40A, 40B, 40C discussed hereinafter. The movement of discs 26A and 26B can provide a sweeping function that sweeps debris into bottoming structure 50. As well, flow through plugs 9 and 24 can be utilized to wash debris out of valve housing 10 when the line is closed, i.e., when discs 26A and 26B are in the expanded position shown in FIG. 1 and FIG. 2. It will be understood that in one possible non-limiting embodiment, as well as the above plugs and valves discussed herein, additional plugs or valves 9 may also be utilized in bonnet 14 and/or cover 9 and that one or more may be used to provide relief a relief line back to the pipe line, which may also comprise one or more spring loaded relief valves.

While the drawings suggest sealing assemblies 40A and 40B could be utilized on either side of stem 30, typically one of type of sealing assembly, such as sealing assemblies 40A, 40B, 40C and/or other sealing assemblies, which are discussed in detail hereinafter, will be utilized on both sides of the stem but the invention is not limited to any particular sealing assembly on both or either side of stem 30. Generally, the sealing assembly utilized on inlet 18 is a mirror image of that used on outlet 20. Moreover, the invention is not limited to the particular sealing assemblies 40A, 40B, and 40C discussed herein and/or variations thereof. The expanding/contracting operation of discs 26A and 26B discussed herein may be utilized with many different types of sealing assemblies or arrangements. Moreover, the more particular sealing assemblies 40A, 40B, and 40C are subject to many variations.

In one embodiment of operation, discs 26A and 26B force or sweep any debris encountered in valve chamber 16 through slots 52 into bottoming structure 50 on flanges, stop surface, shoulder, or the like 53 as the discs move parallel to flow path 19 either towards the retracted or expanded position. If desired, the discs could be moved multiple times parallel for enhanced sweeping function either manually or automatically.

The bottom of the discs engages 53, which provides a stop surface for axial movement of the discs into the flow path. Due to slots 52 formed on flanges 53, the debris can be removed from valve chamber 16 by way of drain plug 24 (FIG. 1) or bottom bleed/flush valve 25 (FIG. 2) located on the outside of valve body 10, which can be centered below bottoming structure 50. Thus, bottoming structure 50 may comprise a lower chamber, slots 52, and stop surfaces or flanges 53, in which slots 52 are formed. Single or multiple slots 52 may be utilized and may be shaped and oriented as desired for removal of debris. The slots may extend along the entire width of discs 26A and 26B and/or may comprise slots that cover a part of the width of discs 26A and 26B. Multiple parallel, diagonal, or the like, slots could be utilized within flanges 53. The debris falls through the slots into the lower chamber of bottoming structure 50, where the debris can be removed, when the valve is closed. The debris may also be flushed out by applying fluid through the valve body, e.g. either from beneath using plug 24 or from the side using vent/bleed plug or valve 9 and/or flushing in both directions while the valve is closed.

FIG. 2 illustrates alternative expanding dual disc gate valve 200 in accord with one possible embodiment of the present invention. The embodiment of valve 200 is designed for applications with larger diameter valves creating with a larger flow path through valve chamber 16 than the embodiment described in FIG. 1. The operation of expanding dual disc gate valve 200 is very similar to that of expanding dual disc gate valve 100 as described herein. However, due to larger flow path, considerably larger forces can act on larger discs, which can urge sideways movement of stem 30, if stem 30 is not supported.

To prevent unwanted strain and movement of stem 30 during operation of large valves, which could otherwise result in seat scoring and leakage and/or bending of stem 30, bottom stem 60 is used to support and guide stem 30 into and out of the closed position. Accordingly, valve stem 30 is supported on both sides of housing 10 and of the flow path through the valve. In one embodiment, bottom stem 60 descends from the bottom of stem bracket 32 to be received by holding pipe 62 and bearing 64 located within bottoming structure 50. However, other embodiments may be provided for supporting bottom stem 60.

In the present embodiment, stem 30 is kept in a substantially central position in valve body 10 by aligning bottom stem 60 with receiving pipe 62 and bearing 64. Receiving pipe 62 is supported on the sides by valve body 10 and secured to valve body 10 by end plate 66. End plate 66 mounted on valve body 10 is sealed with valve body 10 by gasket 29 and secured by bolts 68 locking with connectors 70. In this non-limiting embodiment, end plate 66 contains bottom bleed/flush valve which allows a user access to drain/flush/reverse flush expanding dual disc gate valve 200 of debris, undesirable fluids, coatings, corrosion, or the like, that have accumulated within valve chamber 16, similar to that discussed in reference to FIG. 1, as part of routine easily performed valve maintenance to extend valve operation without the need for disassembly. Various types of anti-corrosive coatings may be utilized as part of maintenance.

As discussed hereinbefore, bottoming structure 50 serves to trap debris present within valve chamber 16 that may interfere with proper valve function and/or damage discs 26A and 26B, as well as sealing assemblies or arrangements 40A and 40B. In operation, discs 26A and 26B can be used to force or sweep debris encountered in valve chamber 16 through slots 52 into bottoming structure 50, which in this embodiment is separated from valve chamber 16, further reducing the likelihood of seating damage during operation of dual expanding disc gate valve 200. In other embodiments, bottoming structure 50 may form part of valve chamber 16, rather than being a separate structure. The bottoms of discs 26A and 26B can be modified to further enhance this sweeping function, if desired. For example, passageways and/or fins may be utilized to direct fluid during the flushing operations and/or may be formed on discs 26A and 26B, in or around slots 53, and the like.

Figure 3:
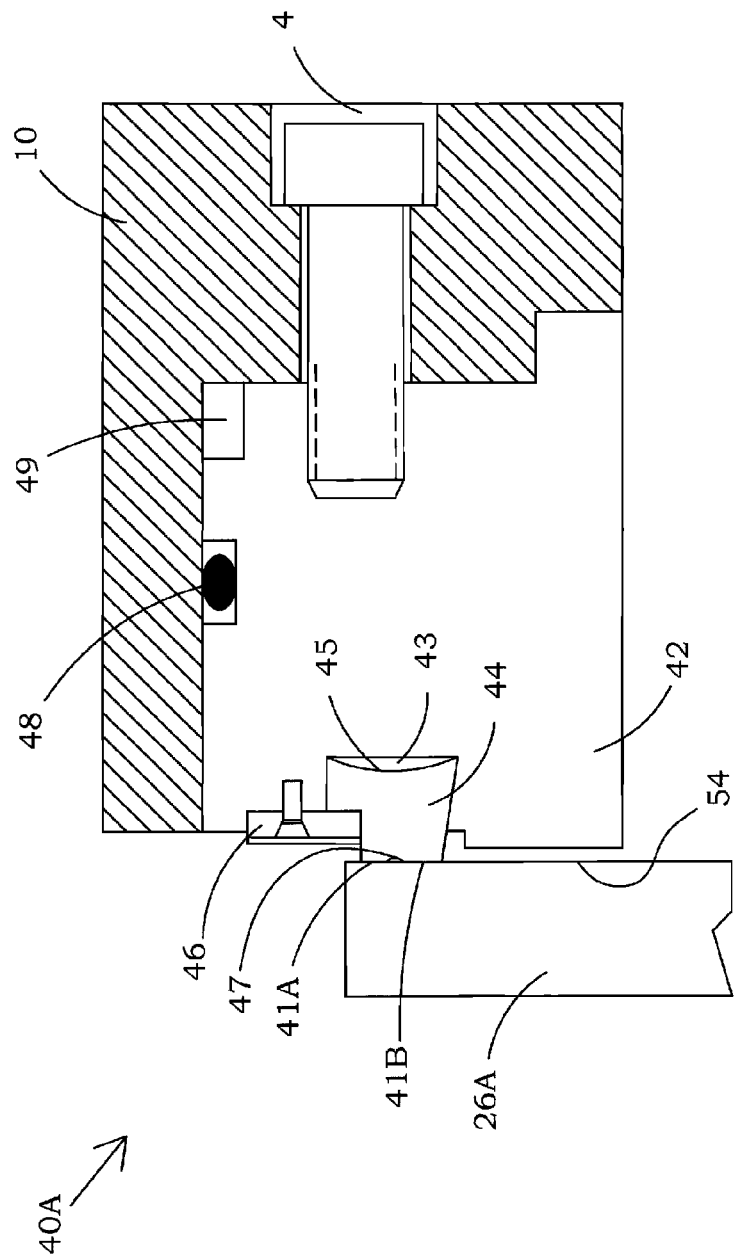
FIG. 3 is an enlarged or detailed elevational view, partially in section, of one possible sealing arrangement of an expanding dual disc gate valve with an in-line removable resilient seat seal in accord with a non-limiting embodiment of the present invention.

Referring now to FIG. 3, sealing assembly 40A, as depicted in an enlarged view in FIG. 3 as compared to FIGS. 1 and 2, represents one possible sealing embodiment incorporated into expanding dual disc gate valve 100. In certain embodiments, access to the sealing assembly 40A or other sealing assemblies is provided from within valve chamber 16 to allow in-line maintenance of the valve seals, without the need to remove valve body 10 from the line, as discussed hereinafter. Accordingly, in-line removable seals or in-line replaceable seals as used herein refers to the possibility of removing seals while the valve body remains connected to the line, which is especially time consuming when the valve body is quite heavy.

In one possible non-limiting embodiment, seat ring holder 42 is secured to valve body 10 by bolts 4 and surrounds the flow path. In other embodiments, seat ring holder 42 could also be threadably engaged with valve body 10, instead of or in addition to fastening with bolt 4, for additional alignment and support during operation and/or to prevent leakage.

Figure 3A:
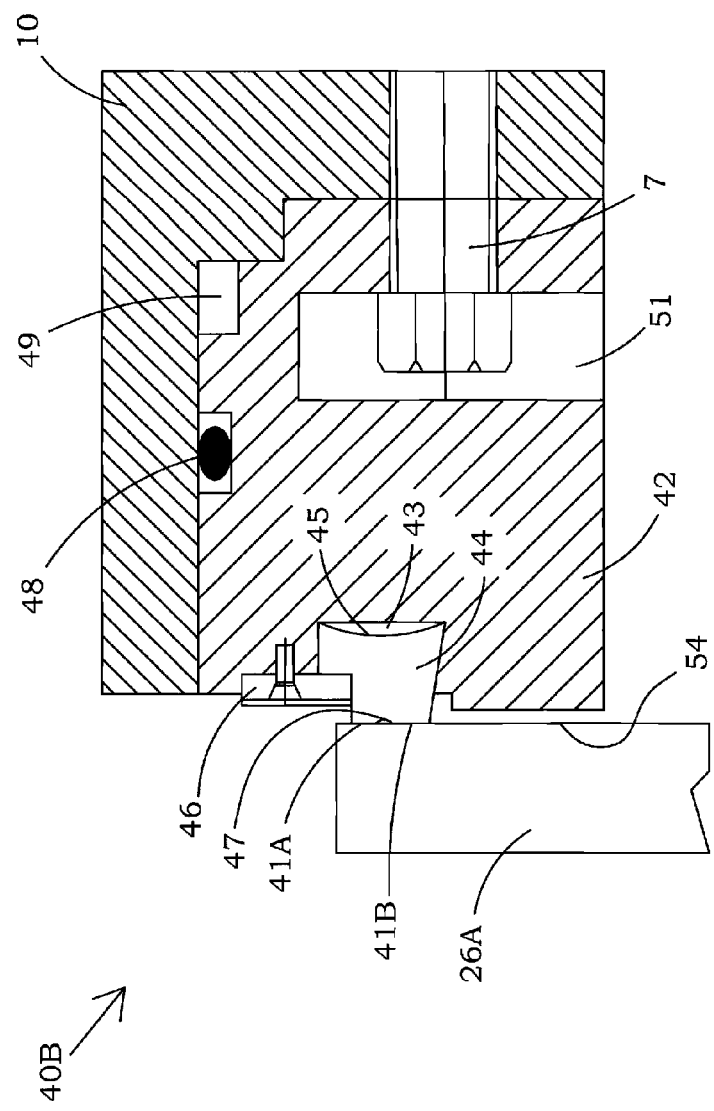
FIG. 3A is an enlarged or detailed elevational view, partially in section, of one possible sealing arrangement of an expanding dual disc gate valve with an in-line removable resilient seat seal and inline removable valve body seals in accord with a non-limiting embodiment of the present invention.

In another non-limiting embodiment of seating assembly 40B, shown in FIG. 3A, seat ring holder 42 is mounted to valve body 10 by bolts 7, which bolts 7 are reversed to engage body 10 from the opposite direction as compared to bolt 4. Slot 51 then provides access from within valve chamber 16 to remove the bolts 7 and replace seat ring holder 42 and/or all corresponding seals, such as seals 48 and 49, if desired through the opening between valve cover 12 and the flow path through valve body 10. At a minimum, seals 48 and 49 can be replaced even if the opening between valve cover 12 and flow path through valve body 10 is not large enough to allow replacement of seat ring holder 42, which would still be moveable within valve body 10, to gain access to seals 48 and 49, which can be utilized to seal between valve body 10 and seat ring holder 42, and/or other sealing assembly structures.

In one possible non-limiting embodiment, seat ring 44 is disposed within circular recess 43 of seat ring holder 42 that surrounds the flow path and held in place by seat holding ring 46 which secures a shoulder of seat ring 44. It will be appreciated that simply by removing seat holding ring 46, by unscrewing the bolts or fasteners, that seat ring 44 may be replaced from within valve chamber 16, as discussed hereinafter. In one possible preferred embodiment, seat ring 44 is made of PTFE or other resilient materials for resilient seat ring surface interaction with disc 26A. Accordingly, in this embodiment seat ring 44 is in-line replaceable.

As discussed above, it will be appreciated that seat ring 44 can be replaced from within the valve chamber 16, which can be accessed by removal of valve cover 12. Accordingly, especially for large valves, bonnet 14, top cover 12, and/or stem components can be removed, for in-line replacement of seat ring 44 and/or seat ring holder 42 and/or other seals such as seals 48 and 49. In this embodiment, the valve body, which can be quite heavy for large valves requiring a crane for lifting, does not need to be disconnected from the pipe, making in-line repairs sometimes much quicker, safer, and less expensive. Seat ring holder 42 may include slots for seals such as Viton seal 48 and graphite seal 49 for sealing seat ring holder 42 with valve body 10. As noted above, the embodiment of FIG. 3A also permits replacement of seals 48 and 49 from within valve chamber 16 for in-line replacement, if desired.

As one example of operation of sealing assembly 40A and 40B, disc 26A will engage seat ring 44 when wedged outward by stem 30, as explained in more detail herein. In this embodiment, seat ring 44, may have concave back 45 and dovetail front 47 (with two tails 41A and 41B) which provides improved compressibility. As concave back 45 bends to accommodate the expansion force exerted by disc 26A against the seat ring 44 as stem 30 is forced downward, dovetail 47 spreads outward creating a vacuum-like seal with disc 26A.

As another novel feature of one non-limiting embodiment of the invention, lip face point seals 41A and 41B are created where the face of disc 26A meets dovetail 47 of resilient seat ring 44. This feature has two basic advantages. Firstly, the two lip face seal in contact with the disc rather than a flat surface improves the seal. Secondly, once the disc has compressed against the two lip face seals, this creates a notch or center chamber which may be V-shaped or otherwise shaped, between lip face point seals 41A and 41B. This center chamber becomes a pressure seal as the seals wedgingly compress against the discs. Prior to closing the valve, the valve is at line pressure in the valve. Closing the valve compresses the center chamber above line pressure. Should there be a small leakage pass on of the two lip face seals, the leakage will further increase the pressure within the notch or chamber. This increased pressure in the chamber increases the internal pressure of the pressure seal, which urges the lip seals to increase their engagement with the disc and effectively works to stop the leak and prevent further leakage.

Furthermore, in one embodiment, metal-to-metal seal 54 can be created below point seals 41A and 41B when disc 26A and the inner surface of seat ring holder 42 make contact after seat ring 44 has compressed within recess 43. In some embodiments, either disc 26A and/or seat ring holder 42 may comprise raised and/or rounded members for creating a point seal at metal-to-metal seal 54. In other embodiments, metal-to-metal seal 54 may comprise a seating design to be described hereinafter in reference to FIG. 4 having a tongue and groove design. Regardless of the type of metal-to-metal seal, the use of a metal-to-metal seal provides a fire-safe product crucial for many applications that can withstand industry determined high temperature and/or pressure (HTP) conditions.

Figure 4:
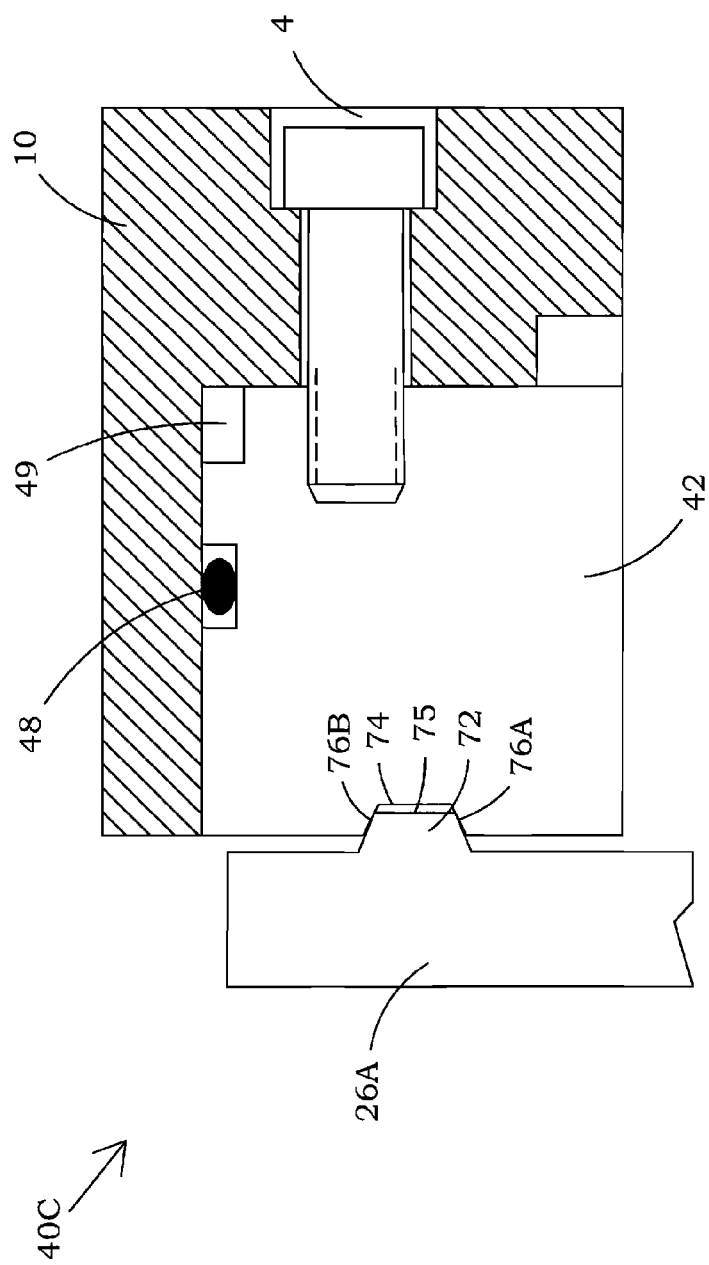
FIG. 4 is an enlarged or detailed elevational view, partially in section, of one possible non-limiting metal-to-metal sealing arrangement of an expanding dual disc gate valve in accord with one possible embodiment of the present invention.

Turning now to FIG. 4, an alternative sealing assembly or arrangement 40C is depicted which comprises one or more metal-to metal seals for expanding dual disc gate valve 100. Seat ring 42 is secured to valve body 10 by means of bolt 4 and seat ring 42 includes Viton seal 48 and graphite seal 49 for sealing seat ring 47 with body 10. Other types of valve body seals may also be used in addition or in lieu of these seals. As one of many possible variations, seat ring 42 may be mounted as shown in FIG. 3A with internally accessible bolt 7 so as to be in-line removable as described hereinbefore. In this embodiment, seat ring 42 has metal groove 74 that encircles the flow path for mating with tongue 72 of disc 26A that also encircles the flow path. A mirror image sealing arrangement is provided for disc 26B on the other side of valve stem 30. In one possible embodiment, tongue 72 may have a larger end 75 width than the bottom width of groove 74 whereby when disc 26A is engaged with seat ring 47, then seals 76A and 76B are wedgingly formed to provide excellent metal to metal seals. Seals 76A and 76B create a metal to metal seal ideal for high temperature and slurry applications requiring a seal which can withstand extreme environments for fire proof operation. In another embodiment, the angle of sides of tongue 72 may be slightly different than the angle of the sides of groove 74 whereby angled and/or point metal seals are formed. In alternative embodiments, tongue 72 could be located on seat ring 42, while groove 74 is located on disc 26A, though the rest of the operation would remain the same.

As stem 30 lowers discs 26A and 26B into valve chamber 16, discs 16A and 16B will contact annular shoulder 52 preventing further downward movement. Stem 30 then wedges discs 26A and 26B laterally outward whereby tongue 72 and groove 74 are substantially aligned and tongue 72 is guided into groove 74 for creating seals 76A and 76B for precision positioning of discs 26A and 26B with respect to the sealing assemblies. In other embodiments, tongue 72 and groove 74 may completely mate to create a seal along the entire mating portion of tongue 72 and groove 74. Tong 72 and groove 74 also provide precise alignment of the disc and seat ring. In another embodiment, the seals of FIG. 3 and FIG. 4 may both be utilized simultaneously, where metal-to-metal groove may be positioned at 54 or other locations, if desired.

Figure 5:
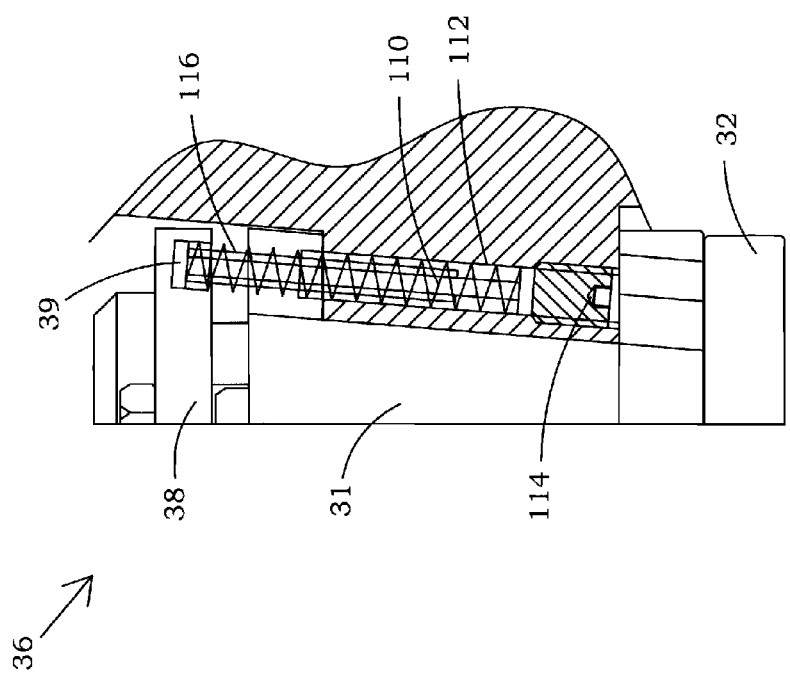
FIG. 5 is an enlarged or detailed elevational view, partially in cross-section, of an assembly mounted at an angle with respect to the valve stem, which is encapsulated and utilized to facilitate movement of the discs to the retracted position for an expanding dual disc gate valve in accord with one possible non-limiting embodiment of the present invention.

Referring now to FIG. 5, there is represented a view of spring assembly 36 which is sufficiently enlarged for better viewing purposes in accord with one possible embodiment of expanding dual disc gate valve 100. It is to be noted that although only spring assembly 36 is described and pictured, a preferred embodiment of expanding dual disc gate valve 100 incorporates at least two spring assemblies disposed on opposite sides of stem 30. Spring assembly 36 is utilized in energizing movement of stem 30 between open and closed positions, and is particularly useful when expanding dual disc gate valve 100 is disposed in a horizontal position where gravity does not necessarily urge the discs downwardly, as shown in the drawings. Spring assembly 36 urges the discs downwardly, as shown in the drawings, for reasons explained hereinafter if not already apparent to enhance movement of the discs to the retracted position.

In one embodiment, spring assembly 36 may comprise one or more springs 110 encapsulated within one or more spring capsules 112. Spring capsule 112 is collapsible so that when spring 110 is compressed and decompressed during operation of expanding dual disc gate valve 100, spring capsule 112 responds to the movements of spring 110. Spring capsule 112 provides a convenient structure enclosing the springs for easier assembly. Spring capsule 112 may comprise stops to limit maximum expansion of the springs for easier insertion of the structure into a pocket of wedging connector 31. Spring capsule 112 may also limit and/or prevent exposure of spring 110 to any fluids and/or materials present in valve chamber 16. If desired, spring capsule 112 may a completely sealed structure which comprises seals between concentric telescoping cylinders. Spring capsule 112 may comprise an internal guide rod and/or external rods or cylinders, such as external member 116, and/or caps or ends or fasteners such as cap or end or fastener members 114.

In one possible non-limiting example, spring assembly 36 is positioned within recess 39 of end plate 38 and buttressed on an opposite side by stem bracket 32. As can be seen in the embodiment of FIG. 5, spring assembly 36 is mounted at a slight angle which may preferably be at the same angle and orientation of the sliding connection between the discs and stem 30 providing for linear movement of stem 30 parallel to the axis of the flow path between retracted and expanded disc positions. In other words, the angle and orientation of spring assembly 36 and the angle and orientation of slot 33 may be the same to apply the maximum spring force. In another embodiment, spring assembly 36 could be oriented in line with stem 30, as generally indicated in FIGS. 6A, 6B, and 6C. In this embodiment, spring assembly 36 is held in a fixed position relative to end plate 38 and stem bracket 32 by end components 114, which may comprise a fastener such as a spring bolt. In other embodiments, end components 114 may comprise fastening means such as pins, latches, and the like. Furthermore, recess 39 could be omitted and other fastening means used to secure spring assembly 36 between end plate 38 and stem bracket 32 or positioned as desired.

Turning now to FIGS. 6A-6C, the operating principles of expanding dual disc gate valve 100 is depicted from an open to a closed position. The same operating principles apply to at least three different types sealing assemblies 40A, 40B, and 40C, discussed hereinbefore, which are positioned on opposite sides FIG. 6A shows expanding dual disc gate valve 100 in an open position whereby stem 30 and discs 26A and 26B are recessed within top cover 12 and/or bonnet 14. However, other types of sealing assemblies could also be utilized. In the valve open position, valve chamber 16 is free from discs 26A and 26B blocking or constricting the flow path through expanding dual disc gate valve 100. As indicated by arrows 37 in FIG. 6A, discs 26A and 26B are in a retracted position with respect to wedge connector 31 and valve stem 30. Except when operating, as shown in FIG. 6C, discs 26A and 26B are kept in the retracted position and therefore do not contact with valve body 10, top cover 12, or the seal assemblies such as seal assemblies 40A or 40B.

As stem 30 moves axially downward within valve chamber 16 perpendicular to the flow path and flow path axis as indicated by arrow 81 in FIG. 6B, discs 26A and 26B move along with stem 30, in a direction parallel to the movement and axis of stem 30. As stem 30 moves downwardly, ultimately, the bottom of discs 26A and 26B contact annular shoulder 53 preventing any further downward movement of discs 26A and 26B, as shown in FIG. 6B. When first touching shoulder 53, discs 26A and 26B are still in the retracted with respect to stem 30 as indicated by arrows 37, but now discs 26A and 26B are impeding a flow path within valve chamber 16 corresponding with openings 18 and 20 respectively. At this time during operation, the bottom portions of disc slides 28A and 28B are still hanging at the bottom of channel 33 around stem bracket 32. Accordingly, prior to encountering shoulder 53, discs 26A and 26B are supported on wedging connector 31 and prevented from further downward movement by stem bracket 32. Essentially, bracket 32 forms the bottom end of sliding channel 33, which may represent interlocking T-shaped connector and T-shaped slot as viewed in a cross-section, or another interlocking sliding connection.

After discs 26A and 26B encounter what may be referred to as shoulder, ledge, flange or stop surface 53, discs 26A and 26B cannot move further downwardly. However, stem 30 continues to move downwardly as indicated by arrow 81. This downward movement perpendicular to the flow path axis of stem 30 causes discs 26A and 26B to slide with respect to stem 30 and wedge connector 31, whereby due to the angled sliding interconnection of channel 33 within wedge connector 31, discs 26A and 26B expand outwardly in a direction parallel to the flow path axis in opposite directions toward seats or seals 44A and 44B discussed hereinbefore. Seals 44A and 44B can be part of seat assemblies 40A and 40B, as shown by corresponding numbers in FIG. 3. As discussed earlier, other types of seating assemblies may be utilized. Once wedged fully outwardly in the expanded position as indicated in FIG. 6C by arrow 35 by continued downward movement of stem 30, expanding dual disc gate valve 100 is in a fully valve closed position.

In operation, as more force is exerted on stem 30 by actuator 8, discs 26A and 26B can no longer move further downward. As discussed herein in reference to FIG. 1, disc slides 28A and 28B are slidingly wedgingly engaged with stem 30 allowing contained movement of disc slides 28A and 28B with respect to stem 30 between stem bracket 32 and end plate 38. Therefore, as stem 30 continues to push further downward, stem 30 creates a wedging interaction with disc slides 28A and 28B, thereby expanding discs 26A and 26B into a sealing arrangement with seating assembly 40A and 40B. Spring assembly 36 is compressed to increase in energy as discs 26A and 26B are forced outwardly. In this fully closed position, expanding dual disc gate valve 100 has completely sealed valve chamber 16 preventing any flow from opening 18 and/or opening 20.

In this configuration, it is possible to verify integrity of expanding dual disc gate valve 100 by accessing drain plug 24 or valve 25, as well as vent 9 to ensure that sealing between discs 26A and 26B, and seating assemblies 40A and 40B are working properly. Thus, the present invention does not require two separate valves to provide the block and bleed action as required by prior art block and bleed valves. The retraction and expansion feature prevents unnecessary damage to discs 26A and 26B during operation, while still providing for maximum sealing capabilities when needed thereby providing a longer valve life. The ability to remove debris from the valve housing, to flush coatings and materials therefrom, and/or to use treated fluids/coatings/oils or the like during flushing further increases the lifespan the valve. Moreover, the in-line maintenance of the seals provides that even seal replacement when required takes less time and/or cost, and is safer to perform.

When the valve is to be opened again from the fully closed position, stem 30 begins to move upwardly. The weight of discs 26A and 26B, as well as the compressed energy force of the spring assemblies 36, urges discs 26A and 26B to retract until stem bracket 32 reaches the disc retracted position shown in FIG. 6B as indicated by arrows 37. In other words, instead of immediately lifting upwardly with stem 30, discs 26A and 26B stay engaged with shoulder or stop surface 52 and move or retract in a direction corresponding to the flow path or axis 19 during initial upward movement of stem 30. Once disc slides 28A and 28B retract to the end of travel of stem bracket 32 as indicated by arrow 37, the discs are fully retracted. Further upward movement of stem 30 now causes discs 26A and 26B to move upwardly with stem 30 without engaging seal assemblies or arrangements 40A and 40B for frictionless movement.

While certain exemplary embodiments have been described in details and shown in the accompanying drawings, it is to be understood that such embodiments are merely illustrative of and not devised without departing from the basic scope thereof, which is determined by the claims that follow. Moreover, it will be appreciated that numerous inventions are disclosed herein which are taught in various embodiments herein and that the inventions may also be utilized within other types of equipment, systems, methods, and machines so that the invention is not intended to be limited to the specifically disclosed embodiments.

What is claimed is:

1. A dual disc gate valve, comprising:
a valve body defining a flow path therethrough;
a valve stem moveable transversely with respect to said flow path, said valve stem being mounted for axial movement in line with an axis of said valve stem;
a first disc slidingly connected with respect to said valve stem on a first side of said valve stem, said first disc being slidable at a first angle with respect to said axis of said valve stem;
a second disc slidingly connected with respect to said valve stem on a second side of said valve stem, said second disc being slidable at a second angle with respect to said axis of said valve stem;
whereby said valve stem is operable for moving said first disc and said second disc into and out of said flow path to an open position and a closed position of said dual disc gate valve;
at least one stop surface positioned to stop movement of said first disc and said second disc with said axial movement of said valve stem towards said closed position;
a first sealing assembly positioned on a first side of said flow path with respect to said valve stem;
a second sealing assembly positioned on a second side of said flow path with respect to said valve stem;
at least one spring positioned to apply a force to said first disc and said second disc wherein said at least one spring is positioned to urge said first disc and said second disc in a direction toward said at least one stop surface, said at least one spring being mounted at an angle with respect to said axis of said valve stem;
whereby continued movement of said valve stem urges said first disc and said second disc to an expanded position so that said first disc engages with said first sealing assembly and said second disc engages with said second sealing assembly, and whereby said axial movement of said valve stem away from said flow path urges said first disc and said second disc to a contracted position to disengage said first disc from said first sealing assembly and said second disc to disengage from said second sealing assembly.

2. The dual disc gate valve of claim 1, wherein said first angle and said second angle have the same magnitude but are in opposite directions with respect to said stem axis.

3. The dual disc gate valve of claim 1, wherein said at least one spring comprises a first spring and a second spring, said first spring being oriented at least substantially in a direction corresponding to said first angle and said second spring being oriented substantially in a direction corresponding with said second angle.

4. The dual disc gate valve of claim 1, further comprising a plurality of grooves in said at least one stop surface.

5. The dual disc gate valve of claim 1, wherein said first sealing assembly comprises a first seal for engagement with said first disc and said second sealing assembly comprises a second seal for engagement with said second disc, said first seal and said second seal being in-line replaceable from an interior of said valve body.

6. The dual disc gate valve of claim 5, wherein said first seal and said second seal comprise resilient seat rings.

7. The dual disc gate valve of claim 5, wherein said first seal and said second seal comprise metal-to-metal seals.

8. The dual disc gate valve of claim 1, wherein said valve stem in a closed position extends across said flow path to a support on said valve housing.

9. A method for making a dual disc gate valve, comprising:
providing a valve body defining a flow path therethrough;
mounting a valve stem for axial movement in line with an axis of said valve stem and transversely with respect to said flow path;
slidingly connecting a first disc with respect to said valve stem on a first side of said valve stem utilizing at least one wedge;
providing a sliding interconnection between said first disc and said at least one wedge, said sliding interconnection being at a first angle with respect to said axis of said valve stem, wherein said sliding interconnection comprises at least one first slot at said first angle whereby movement of said at least one wedge away from said flow path urges said first disc to a contracted position;
slidingly connecting a second disc with respect to said valve stem on a second side of said valve stem utilizing said at least one wedge, said second disc being slidable at a second angle with respect to said axis of said valve stem;
providing that said valve stem is operable for moving said first disc and said second disc into and out of said flow path to an open position and a closed position of said dual disc gate valve;
mounting a first sealing assembly on a first side of said flow path with respect to said valve stem;
mounting a second sealing assembly on a second side of said flow path with respect to said valve stem;
mounting at least one spring to apply a force to said first disc and said second disc;
providing at least one stop surface whereby when said first disc and said second disc are engaged with said at least one stop surface then said first disc and said second disc are moveable to an expanded position so that said first disc engages with said first sealing assembly and said second disc engages with said second sealing assembly, and whereby said first disc and said second disc are moveable to said contracted position to disengage said first disc from said first sealing assembly and said second disc from said second sealing assembly; and
providing said first sealing assembly with a resilient seat ring positioned within a groove, providing that when said valve is in said open position said resilient seat ring has a concave back that extends away from said groove, and providing that when said valve is in said closed position said concave back is compressed to engage said groove.

10. The method of claim 9, further comprising providing that said first sealing assembly comprises a metal tongue and a metal receptacle, providing that said metal tongue has an end larger than a base of said metal receptacle, providing angled sides for said metal tongue and said metal receptacle whereby in said closed position said angled sides are wedgingly engaged to provide a metal-to-metal seal.

11. A dual disc gate valve connectable to a line, comprising:
a valve body with a flow path therethrough;
a valve cover mounted to said valve body that covers a valve cover opening leading to said flow path;
a first sealing assembly mounted around a first side of said flow path and a second sealing assembly mounted around a second side of said flow path;

a valve stem moveable transversely with respect to said flow path, said valve stem being mounted for axial movement in line with an axis of said valve stem;

a first disc and a second disc mounted to be moveable in a retracted position into said flow path, said first disc and said second disc each being mounted to be wedgingly moveable in an angled direction with respect to said axis of said valve stem to an expanded position when positioned in said flow path;

a stop surface positioned to engage said first disc and said second disc as said valve stem is moved towards said flow path;

at least one spring positioned to apply a force to said first disc and said second disc wherein said at least one spring is positioned to urge said first disc and said second disc in a direction toward said stop surface, said at least one spring being mounted at an angle with respect to said stem axis;

a first seal mounted in said first sealing assembly which is positioned to engage with said first disc when said first disc is in said expanded position and is offset from said first disc when said first disc is in said retracted position;

a second seal mounted in said second sealing assembly which is positioned to engage with said second disc when said second disc is in said expanded position and is offset from said second disc when said second disc is in said retracted position;

said first seal and said second seal being mounted so as to be removable through valve cover opening whereby said first seal and said second seal are in-line replaceable.

12. The dual disc gate valve of claim 11, further comprising a first metal seat ring holder mounted to said valve body and a second metal seat ring holder mounted to said valve body, said first seal being mounted to said first metal seat ring holder and said second seal being mounted to said second seat ring holder, a first seat ring holder seal between first metal seat ring holder and said valve body, a second seat ring holder seal between said second metal seat ring holder and said valve body, whereby said first metal seat ring holder and said second metal seat ring holder are mounted such that said first seat ring holder seal and said second seat ring holder seal are removable through said valve cover opening.

13. A dual disc gate valve, comprising:
a valve body with a flow path therethrough;
a first sealing assembly mounted around a first side of said flow path and a second sealing assembly mounted around a second side of said flow path;
a first disc and a second disc mounted to be moveable in a retracted position into said flow path, said first disc and said second disc being mounted to be moveable to an expanded position when positioned in said flow path whereby said dual disc gate valve is in a closed position;
a first seal for said first sealing assembly which is positioned to engage with said first disc when said first disc is in said expanded position and is offset from said first disc when said first disc is in said retracted position, said first seal comprising a first metal tongue and a first metal receptacle, said first metal tongue comprising a first metal tongue end larger than a first metal receptacle base, first angled sides for said first metal tongue and said first metal receptacle whereby in said closed position said first angled sides are wedgingly engaged to provide a metal-to-metal seal; and
a second seal for said second sealing assembly which is positioned to engage with said second disc when said second disc is in said expanded position and is offset from said second disc when said second disc is in said retracted position, said second seal comprising a second metal tongue and a second metal receptacle, said second metal tongue comprising a second metal tongue end larger than a second metal receptacle base, second angled sides for said second metal tongue and said second metal receptacle whereby in said closed position said angled sides are wedgingly engaged to provide a metal-to-metal seal.

14. A dual disc gate valve, comprising:
a valve body with a flow path therethrough;
a first sealing assembly mounted around a first side of said flow path and a second sealing assembly mounted around a second side of said flow path;
a first disc and a second disc mounted to be moveable in a retracted position into said flow path, said first disc and said second disc being mounted to be moveable to an expanded position when positioned in said flow path whereby said dual disc gate valve is in a closed position;
a first seal for said first sealing assembly which is positioned to engage with said first disc when said first disc is in said expanded position and is offset from said first disc when said first disc is in said retracted position, said first seal comprising a first resilient seat ring positioned within a first groove, whereby when said first and second disc are in said retracted position, then said first resilient seat ring has a first concave back that extends away from a first bottom of said first groove, and when said valve is in said closed position then said first concave back is compressed to engage said first bottom of said first groove; and
a second seal for said second sealing assembly which is positioned to engage with said second disc when said second disc is in said expanded position and offset from said second disc when said second disc is in said retracted position, said second seal comprising a second resilient seat ring positioned within a second groove, whereby when said first and second disc are in said retracted position, then said second resilient seat ring has a second concave back that extends away from a second bottom of said second groove, and when said valve is in said closed position then said second concave back is compressed to engage said second bottom of said second groove.

15. A dual disc gate valve, comprising:
a valve body with a flow path therethrough;
a first sealing assembly mounted around a first side of said flow path and a second sealing assembly mounted around a second side of said flow path;
a first disc and a second disc mounted to a valve stem to be moveable in a retracted position into said flow path, said first disc and said second disc being mounted to be moveable with respect to at least one wedge carried by said valve stem to an expanded position when positioned in said flow path whereby said dual disc gate valve is in a closed position;
a sliding interconnection between said first disc and said at least one wedge wherein said sliding interconnection comprises at least one slot at an angle with respect to said valve stem, whereby movement of said at least one wedge away from said flow path moves urges said first disc to move along said angle to said retracted position;
a first seal for said first sealing assembly which is positioned to engage with said first disc when said first disc is in said expanded position and is offset from said first disc when said first disc is in said retracted position;
a second seal for said second sealing assembly which is positioned to engage with said second disc when said second disc is in said expanded position and is offset from said second disc when said second disc is in said retracted position; and a bottoming structure located within said valve body for accumulating debris from within said valve body to prevent damage to said first and second discs, said bottoming structure comprising a shoulder adjacent a recessed basin, said bottoming structure further comprising a drain for removing said debris from said valve body, wherein said shoulder is slotted for allowing particles and/or debris to be forced through said shoulder by said first and second discs.

16. The dual disc gate valve of claim 15, further comprising a flushing system operable for flushing said debris through said drain when said first disc and said second disc are in said expanded position whereby said dual disc gate valve is in said closed position.

\* \* \* \* \*